(12) United States Patent
Johnson, III et al.

(10) Patent No.: US 7,988,323 B2
(45) Date of Patent: Aug. 2, 2011

(54) LIGHTING DEVICES FOR ILLUMINATION AND AMBIANCE LIGHTING

(75) Inventors: H. Fisk Johnson, III, Racine, WI (US);
Jose Porchia, Greenfield, WI (US);
Barry T. Calpino, Portage, MI (US);
Jeffrey J. Wolf, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 75 days.

(21) Appl. No.: 12/569,432

(22) Filed: Sep. 29, 2009

(65) Prior Publication Data
US 2010/0013414 A1 Jan. 21, 2010

Related U.S. Application Data

(60) Division of application No. 11/764,526, filed on Jun. 18, 2007, now abandoned, which is a continuation of application No. 10/561,822, filed as application No. PCT/US2004/21532 on Jul. 2, 2004, now abandoned.

(60) Provisional application No. 60/483,913, filed on Jul. 2, 2003.

(51) Int. Cl.
*F21S 9/00* (2006.01)

(52) U.S. Cl. .............. 362/228; 362/249.02; 362/249.01; 362/249.05; 362/253; 362/800

(58) Field of Classification Search .................. 362/228, 362/249.01, 249.02, 249.05, 253, 800
See application file for complete search history.

(56) References Cited

U.S. PATENT DOCUMENTS

| | | | |
|---|---|---|---|
| 4,677,533 A | 6/1987 | McDermott et al. | |
| 5,688,042 A * | 11/1997 | Madadi et al. | 362/240 |
| 5,961,204 A * | 10/1999 | Martich et al. | 362/295 |
| 6,688,753 B2 * | 2/2004 | Calon et al. | 362/236 |
| 6,759,966 B1 * | 7/2004 | Weng | 340/825.69 |
| 6,965,205 B2 | 11/2005 | Piepgras et al. | |
| 2003/0057886 A1 | 3/2003 | Lys et al. | |
| 2003/0214259 A9 | 11/2003 | Dowling et al. | |
| 2003/0223230 A1 | 12/2003 | Li | |
| 2004/0264187 A1 | 12/2004 | Vanderschuit | |
| 2005/0195600 A1 | 9/2005 | Porchia | |

FOREIGN PATENT DOCUMENTS
DE 100 11 077 9/2001
* cited by examiner

*Primary Examiner* — Evan Dzierzynski

(57) ABSTRACT

An Edison-style light bulb (40) which supports a plurality of light emitting diodes (LEDs) (50) and an illumination source (54). First and second electrical circuits (56) and (58) are mounted in the bulb to supply electrical power to the illumination source and to the LEDs. A switch circuit (60) is connected to control the supply of electrical power to the first and second electrical circuits (56) and (58) to adjust and coordinate the light output from the LEDs (50) and from the illumination source (54).

17 Claims, 7 Drawing Sheets

US 7,988,323 B2

LIGHTING DEVICES FOR ILLUMINATION AND AMBIANCE LIGHTING

This application is a divisional application of copending U.S. patent application Ser. No. 11/764,526, filed Jun. 18, 2007, which is a continuation application of copending U.S. patent application Ser. No. 10/561,822, filed Apr. 25, 2006, which is a U.S. national stage application of PCT International Application No. PCT/US2004/021532, filed Jul. 2, 2004, and which claims priority from U.S. provisional patent application No. 60/483,913, filed Jul. 2, 2003.

BACKGROUND OF THE INVENTION

1. Field of the Invention

Our invention relates to novel lighting devices which provide light for illumination as well as ambient light.

2. Description of Related Art

Electric lamps, and the light bulbs used therein, which provide illumination are well known and are widely used. These lamps and bulbs fall into two general categories, namely, incandescent and fluorescent. More recent developments in lighting have led to advancement in light emitting diodes (LEDs). An LED is a semiconductor device that emits visible light when an electrical current passes through it The light from an LED is basically monochromatic and the color of the light is determined by the particular material used in the semiconductor (although current applied to the LED can be used to vary the perceived color) LEDs have the advantage of low power requirements, high efficiency and long life. The outputs of several different color LEDs can be mixed so as to produce additional colors, including white light, and different brightness LEDs can also be used to provide background lighting to achieve desired ambient effects. However, they have limited brightness and therefore they are generally not suitable for illumination purposes. Instead, LEDs have been generally used for such applications as indicator lights, panel backlighting and fiber optic data transmission.

U.S. Pat. No. 6,149,283 discloses an LED lamp/bulb having a multicolor adjustor. This device comprises a base in which several LEDs capable of producing different colored light are mounted. Adjustable switches are provided for the different color LEDs so that the colors can be mixed in any desired ratio to produce desired lighting effects such as varying colors, including white light, and varying brightness. This patent acknowledges that the lumen output of LEDs is not as high as an incandescent source of the identical wattage.

U.S. Pat. No. 5,924,784 discloses providing ambient light (simulating a candle flame) from both a free-standing lamp and an Edison-style light bulb (i.e., a screw-in bulb that mates with a conventional light bulb socket) using LEDs. The flame simulation is provided through both color combinations emitted and flicker effects The patent states that it is directed to bulbs and lamps used for achieving soothing effects in memorials and the like.

U.S. Pat. Nos. 6,016,038, 6,150,774, 6,166,496, 6,211,626, 6,292,901 and 6,340,868 disclose various techniques and electrical circuits for controlling the light output of several LEDs according to predetermined programs.

SUMMARY OF THE INVENTION

This invention makes possible the provision of desired ambient or background light together with illumination light in a single lamp fixture or light bulb.

According to one embodiment of our invention, there is provided a novel electrical lamp which includes an illumination socket for mounting an illumination bulb which emits illumination light, a plurality of light emitting diodes which emit light of different colors, a base in which the illumination socket and the light emitting diodes are positioned in proximity to each other, a first electrical circuit connected to supply electrical power to the illumination socket, a second electrical circuit connected to supply electrical power to the light emitting diodes, and switching means connected to selectively switch the application of electrical power between the first electrical circuit and the second electrical circuit The illumination socket is a socket for mounting an illumination bulb selected from the group consisting essentially of incandescent bulbs, fluorescent bulbs and halogen bulbs In another embodiment, our invention is directed to a light bulb. The bulb includes an illumination source which emits illumination light, a plurality of light emitting diodes which emit light of different colors, a base on which the illumination source and plurality of light emitting diodes are mounted in proximity to each other, a first electrical circuit connected to supply electrical power to the socket, a second electrical circuit connected to supply electrical power to the light emitting diodes, and a switch connected to selectively switch the application of electrical power between the first electrical circuit and second electrical circuit. Also, the illumination source is selected from the group consisting essentially of incandescent bulbs, fluorescent bulbs and halogen bulbs (When we talk about such conventional "bulbs" used in connection with the lamps and bulbs according to our invention, the conventional "bulbs" may include replaceable screw-in bulbs and the like, as well as more permanent light emitting devices mounted in bulbs or lamps of our invention.)

In another embodiment, our invention is directed to a light bulb having a base configured to mate with a light bulb socket. At least one compact fluorescent bulb is mounted on the base. Also, a plurality of light emitting diodes are mounted on the base, which LEDs emit light of different colors A control circuit supplies power from the light socket, when the base is mounted therein, to the at least one fluorescent bulb and the plurality of light emitting diodes. A translucent housing is mounted on the base and contains the at least one fluorescent bulb and the plurality of light emitting diodes.

In yet another embodiment, our invention is directed to a light bulb having a base configured to mate with a light bulb socket. A light emitting device is mounted on and receives power from the base. The light emitting device is selected from the group consisting essentially of halogen, incandescent, fluorescent, and low vapor mercury light emitting devices. A plurality of light emitting diodes are also mounted on and receive power from the base The plurality of light emitting diodes emit light of different colors. A programmable processor controls the activation, color and intensity of the light emitted from the plurality of the light emitting diodes Again, a translucent housing is mounted on the base and contains the light emitting device and the plurality of light emitting diodes.

In another embodiment, our invention is directed to a light bulb having a base configured to mate with a light bulb socket. A light emitting device is mounted on and receives power from the base The light emitting device is selected from the group consisting essentially of halogen, incandescent, fluorescent, and low vapor mercury light emitting devices. A plurality of light emitting diodes are mounted on and receive power from the base. The plurality of light emitting diodes emit light of different colors. A user interface controls the activation, color and intensity of the light emitted from the plurality of the light emitting diodes Further, a translucent housing is mounted on the base and contains the light emitting device and the plurality of light emitting diodes.

DETAILED DESCRIPTION OF THE PREFERRED EMBODIMENT

Figure 1:
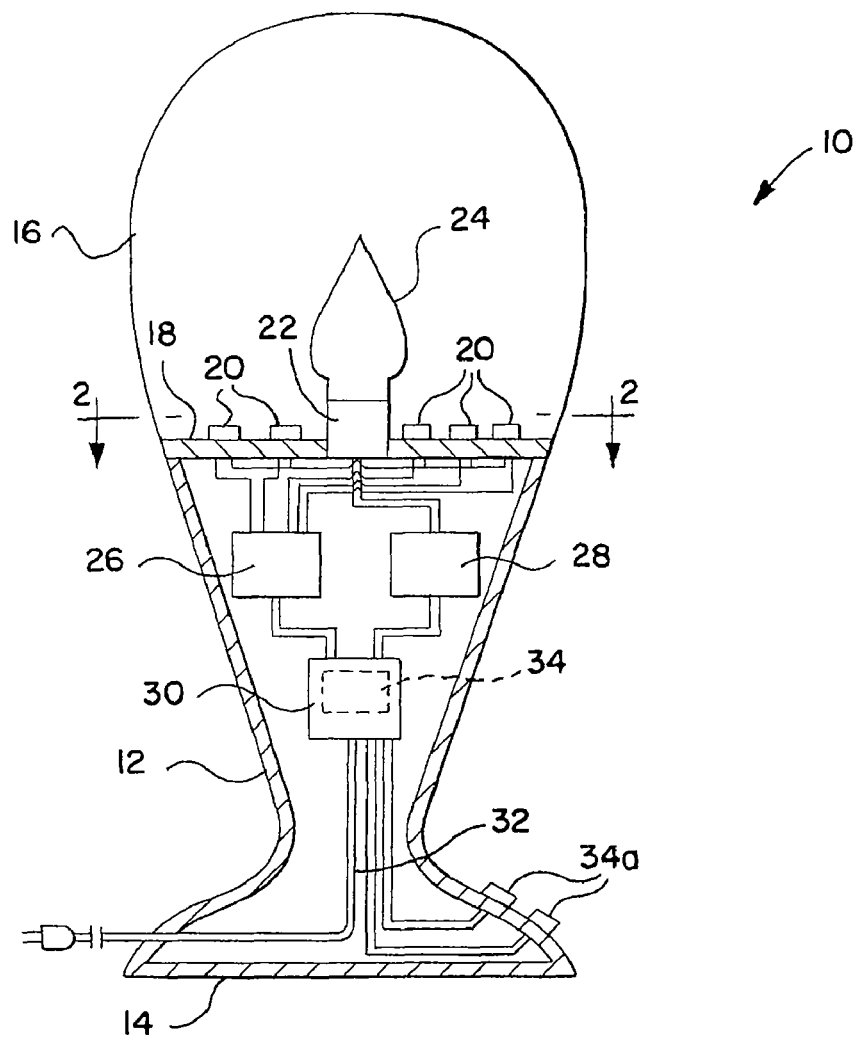
FIG. 1 is a diagrammatic elevational sectional view of a lamp according to one embodiment of our invention.

As shown in FIG. 1, a lamp 10 according to one embodiment of our invention includes a base 12 having a flat bottom 14, which may rest on a horizontal surface, such as a table top or a desk, and a translucent shade 16, which extends up from the base and which permits light generated therein to be emitted out from the lamp. The base 12 includes a bulb support 18 near its upper end. The bulb support 18 serves as a mounting for a plurality of light emitting diodes (LEDs) 20 as well as a socket 22 for an illumination bulb 24, which may be, for example, a conventional, screw-in incandescent bulb. As can be seen, the LEDs 20 and the illumination bulb 24 are positioned so that light generated from these devices can be emitted through the shade 16

Figure 2:
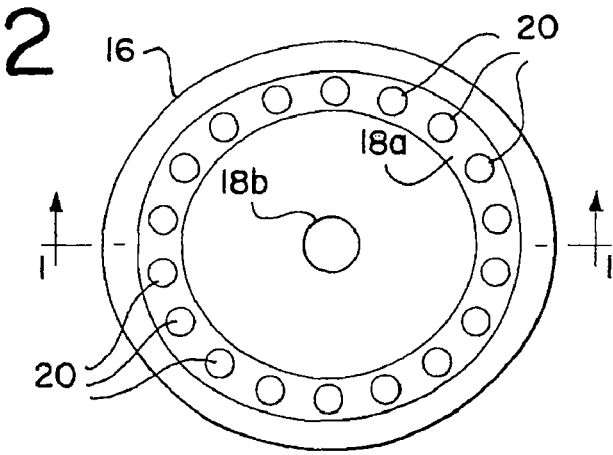
FIG. 2 is a sectional view along line 2-2 of FIG. 1.

The bulb support 18, as shown in FIG. 2, has an outer portion 18a in the form of a ring; and the LEDs 20 are distributed around this outer portion The bulb support 18 also includes a center portion 18b which supports the illumination bulb socket 22.

Figure 3:
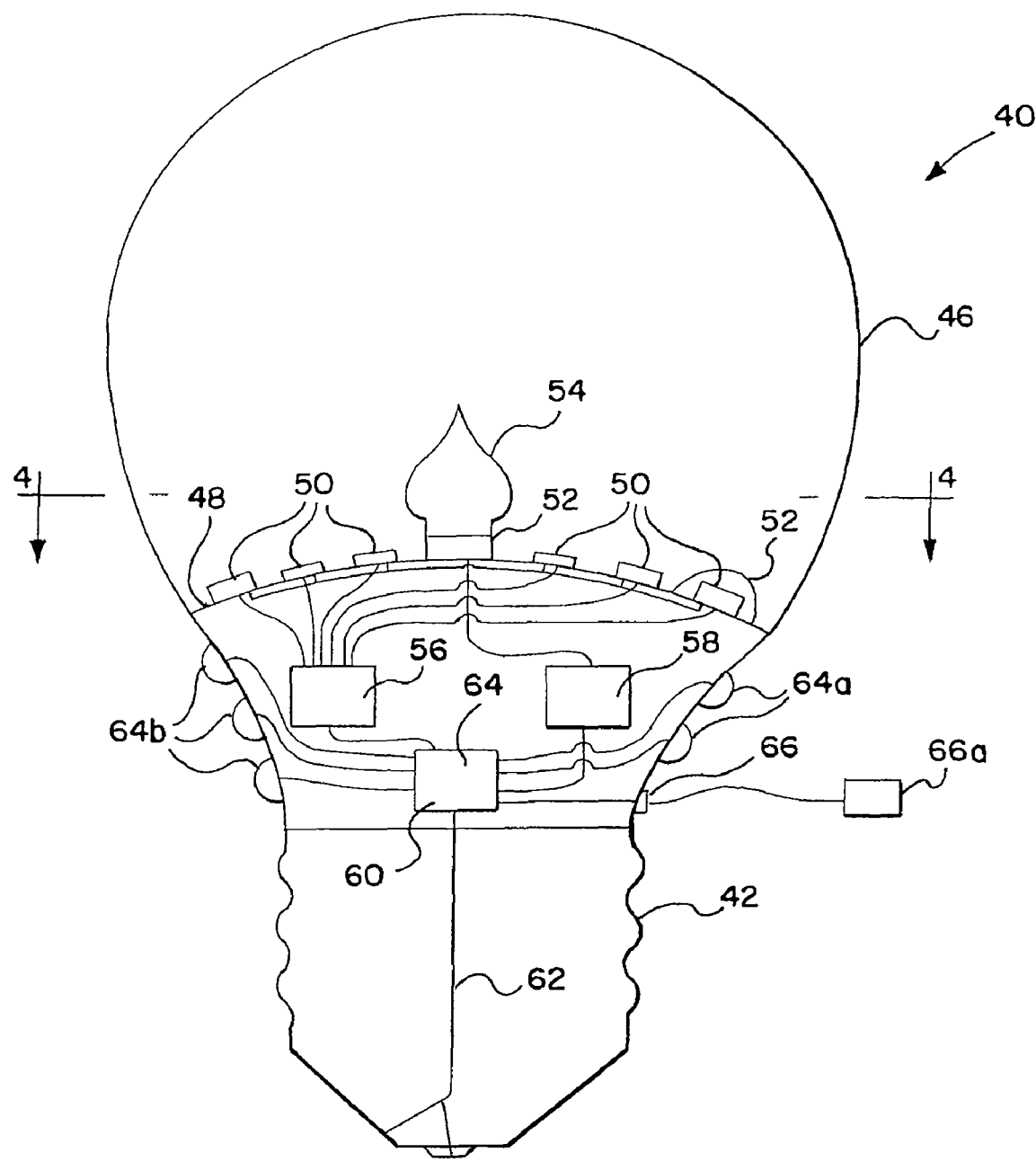
FIG. 3 is a diagrammatic elevational sectional view of an Edison-style light bulb according to another embodiment of our invention.

A first electrical circuit 26 is provided in the base 12 and is connected to supply electrical power to each of the LEDs 20. A second electrical circuit 28, also provided in the base 12, is connected to supply electrical power to the illumination bulb socket 22. A switch circuit 30 is also provided in the base 12 and is connected to supply electrical power to the first and second electrical circuits 26 and 28. The switch circuit 30 is connected to a power line 32, which may receive electrical power from a battery (not shown) contained within the lamp base 12, or from an outside source such as a household electrical output The switch circuit 30 includes a program control unit 34, which is configured to switch electrical power to the first and second electrical circuits 26 and 28 as desired, i.e., either to both simultaneously or to each alternately, depending on the type of light to be produced by the lamp 10 The program control unit includes control switch actuators 34, which are located on the base 12 for manual adjustment of the output intensity or brightness of the LEDs 20 and of the illumination bulb 24 The program control unit 34 may also incorporate an internal program and associated circuits which provide adjustment of the LEDs 20 and the illumination bulb 24 in a predetermined manner This can provide selectable light shows among which a user may choose. In addition, sensors (not shown) may be provided to sense other conditions in the area of the lamp 10, e.g., temperature, scent, sound, motion, etc., and to adjust the program in the program control unit 34 so as to coordinate the light outputs from the lamp 10 with such sensed conditions As shown in FIG. 3, an Edison-style light bulb 40 according to another embodiment of the invention includes a threaded, Edison-style base 42 for use with conventional light bulb sockets. (Of course, the bulb may be configured to mount in other conventional sockets for mounting light bulbs, such as fluorescent and halogen) A translucent housing 46 extends up from base 42. The translucent housing 46 allows light generated therein to be emitted from the bulb.

A lighting support 48 is positioned within housing 46, and serves as a mounting for, a plurality of LEDs 50 and an illumination source mounting socket 52. Socket 52 mounts, and provides power to, an incandescent illumination source 54. Light generated by the LEDs 50 and illumination source 54 is emitted through housing 46 Housing 46 may be releasably secured to base 42, to allow for replacement of illumination source 54.

Figure 4:
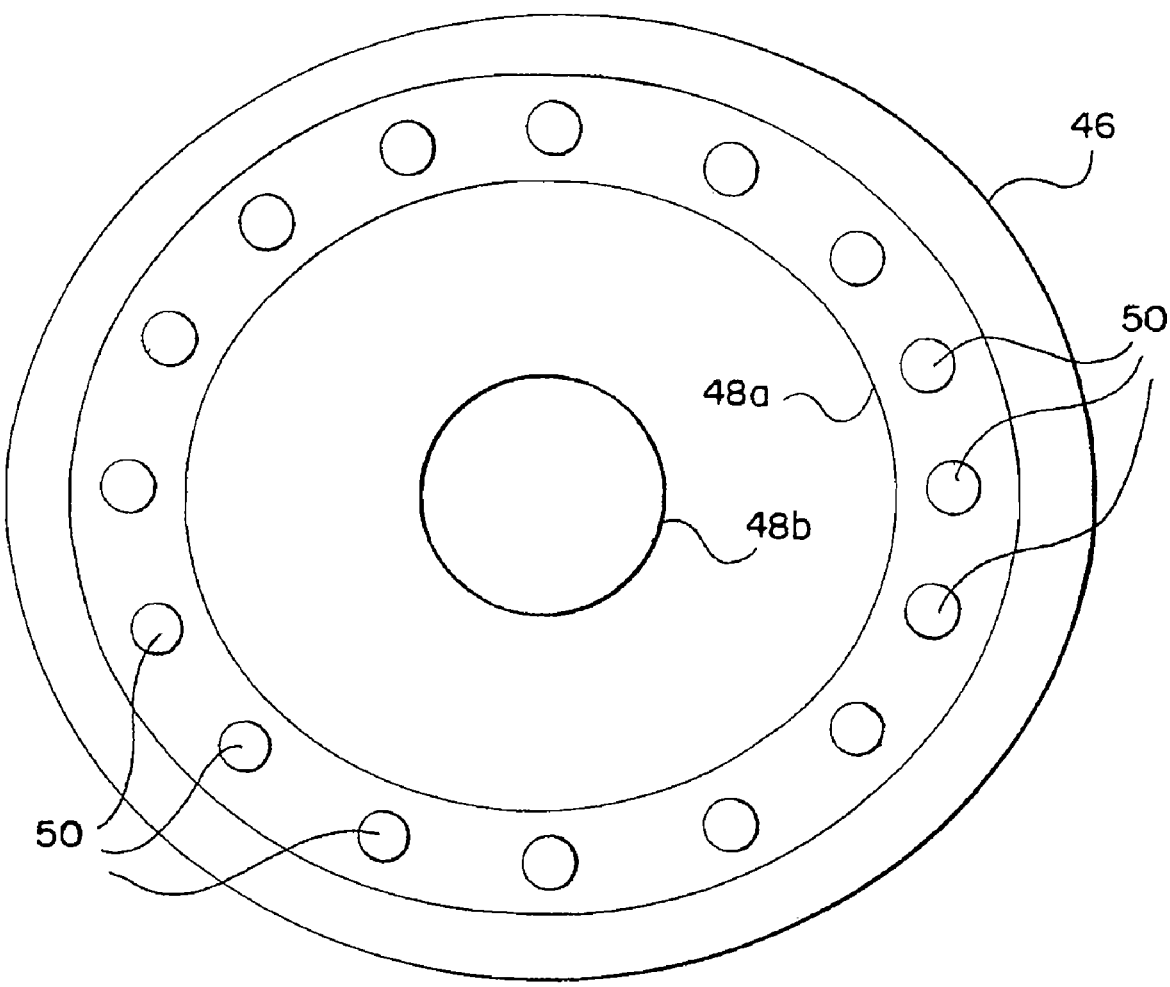
FIG. 4 is a sectional view along line 4-4 of FIG. 3.

The light source support 48, as shown in FIG. 4, has an outer portion 48a in the form of a ring. The LEDs 50 are distributed around this outer portion. The light source support 48 also includes a center portion 48b which supports socket 52, or the illumination source 54, when the illumination source 54 is fixedly mounted on support 48 without a socket A socket is preferably used in order to allow for replacement of burned out illumination sources, since the LEDs 56 are expected to outlast any conventional illumination source.

A first electrical circuit 56 is connected to supply electrical power to each of the LEDs 50. A second electrical circuit 58 is connected to supply electrical power to illumination source 54 Also provided is a switch circuit 60, which is connected to supply electrical power to the first and second electrical circuits 56 and 58 The switch circuit 60 is connected to power supply line 62, which receives electrical power from an Edison-style light bulb socket when mounted thereon. The switch circuit 60 includes a program control unit 64, which is configured to switch electrical power to the first and second electrical circuits 56 and 58 as desired, depending on the type of light to be produced. The program control unit 64 includes control switch actuators 64a, which are located on the outside of housing 46. The control switch actuators 64a provide for switching between different modes of light presentation, i.e., activating either one of first and second electrical circuits 56 and 58, or activating both simultaneously. The program control unit 64 also includes switch actuators 64b, also located on the outside housing 46, for manual adjustment of, for example, the output intensity or brightness of the LEDs 50 and illumination source 54, pre-programmed light shows using the LEDs 50, the color of the light provided by the LEDs 50, etc. The control switch actuators 64b may operate by controlling internal programs and associated circuits of program control unit 64. In addition, any one of a number of control mechanisms may be used in keeping with the present invention including microprocessors, mechanical activity devices, software driven control, and the like Also, we have referred to the depicted LEDs 50 as separate light emitting diodes; however, the depicted LEDs 50 may also be individual groups of light emitting diodes. For instance, a single LED group 50 may include three individual light emitting diodes specific to colors red, green, and blue, respectively With such a configuration, the program control unit 64 may individually set the relative intensity of each of the light emitting diodes of each group so as to control the color emitted from those groups, i.e., the color emitted from a depicted LED group 50 may be varied based on the combination of colors from the individual light emitting diodes of the group A user may perceive the combined color by way of positioning the individual diodes of an LED group 50 so closely together as to produce an overall color effect, or alternatively, a translucent shade (e.g., a diffuser) 52 may be provided to cover each LED 50, thus providing for a single perceived color to be emitted from each shade 52 as if it were a single pixel The program control unit 64 further includes a sensor input 66 for receiving signals from a sensor 66*a*. Sensor 66*a* may be provided on the light bulb 40 or at a remote location. When positioned at a remote location, signals from sensor 66*a* may be transmitted to the sensor input 66 by way of a direct connection or a wireless connection (i.e., radio signal, infrared signal, etc.)

Sensor 66*a* may sense such stimuli as temperature, sound, motion, etc. The program control unit 64 may adjust a program for operation of LEDs 50 and illumination source 54 based on the sensed conditions In addition, control signals may also be provided by direct connection or a wireless connection by a user, rather than a sensor For instance, as regards direct connection, a user may simply vary the application of the power source by toggling a power switch which controls the power supply to the device with which bulb 40 is mated. In this case, the sensor input 66 may sense the power supply and change the control of the device based on the timing of the activation and deactivation of the power supply. Alternatively, a remote control may be provided so that a user may send control signals (e.g., radio signals, infrared signals, etc.) to the sensor input 66. These control options may be provided in addition to or in lieu of switches 64*a* and 64*b*.

Figure 5:
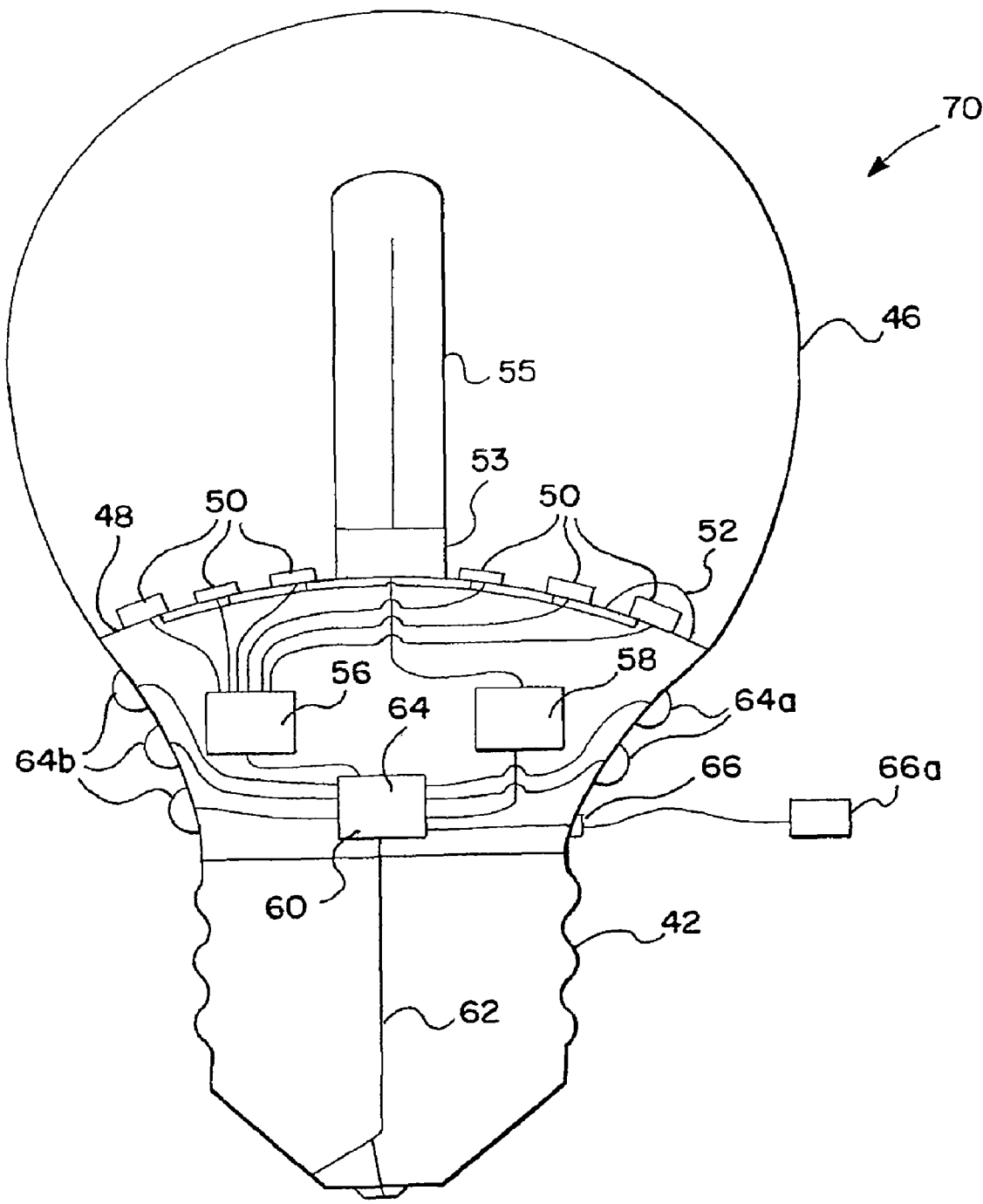
FIG. 5 is a diagrammatic elevational sectional view of an Edison-style light bulb according to another embodiment of our invention.

FIG. 5 shows an Edison-style light bulb 70 according to yet another embodiment of our invention. In this embodiment, a fluorescent illumination source 55 is mounted on a socket 530*f* course, the illumination may be provided in a conventional light bulb socket, which allows for replacement of the bulb, or alternatively may be a lighting device permanently affixed to a device according to our invention. The remainder of the features of light bulb 70 are similar to the like-numbered features discussed above with respect to light bulb 40, shown in FIG. 3

Figure 6A:
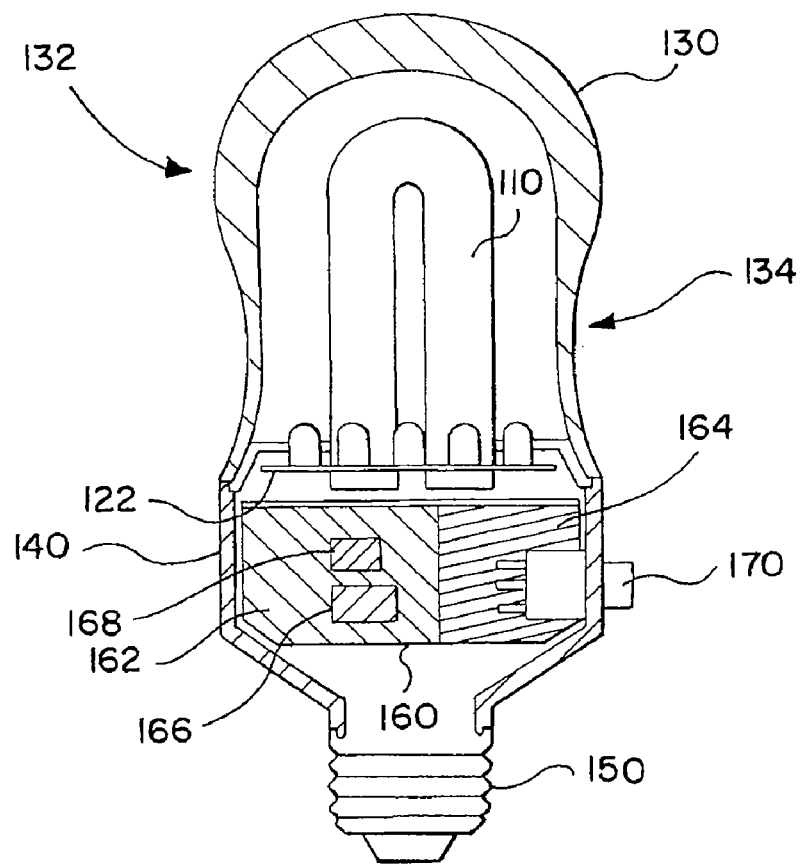
FIGS. 6A and 6B are a cross-sectional and top view, respectively, of another bulb according to an embodiment of our invention.
Figure 6B:
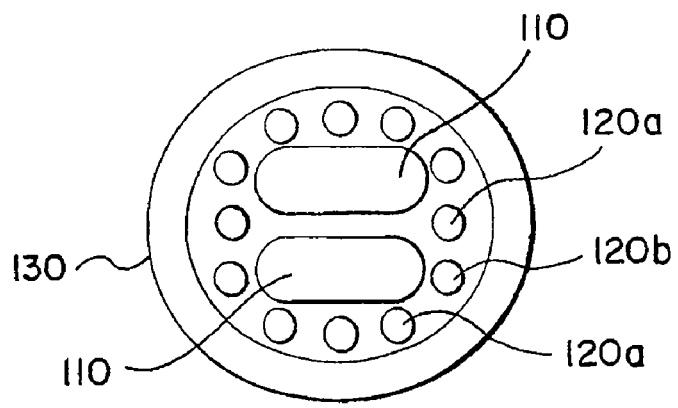

FIGS. 6A and 6B show another embodiment of our invention embodied in bulb 100. Bulb 100 is similar to previous embodiments in that it includes a base 140 having a screw-in connector 150 adapted to mate with a conventional incandescent light bulb socket in a lamp or the like. Of course, connector 150 may be of any one of a number of configurations that mate with other conventional light sockets (e.g., fluorescent, halogen, etc.)

Bulb 100 also includes a translucent housing 130. Housing 130 encloses bulbs 110. While other light emitting devices may be provided to provide the bright, white light associated with conventional light bulbs, it is preferred that compact fluorescent bulbs be used. (Of course, bulbs 110 may be replaceable light bulbs, or more permanently affixed light emitting devices.) In this embodiment, we will discuss a plurality of compact fluorescent bulbs which are provided to increase the power of the bulb 100 and the overall surface area within housing 130 emitting white light (or the like).

As is shown in FIG. 6A, compact fluorescent bulbs 110 are each formed in an upside down, substantially U-shaped configuration. (Of course, other arrangements are possible while keeping with the scope of our invention). In particular, a compact fluorescent bulb 110 may have a first electrode at one end from which it extends up in a direction away from base 140, until it bends back on itself near the top of housing 130, so as to extend back toward base 140 to a second electrode at the other end. FIGS. 6A and 6B show two such bulbs 110.

Alternatively, compact fluorescent bulbs 110 can be formed of a single bulb that has a plurality of separate lengths, each of which extends up from the base 140 and then bends back on itself to extend back to base 140, with the lengths being interconnected so as to have only two electrodes, each at opposite ends of the total length. More specifically, while FIGS. 6A and 6B appear to show two separate U-shaped bulbs, the term plurality of compact fluorescent bulbs used within this specification can refer to a single compact fluorescent bulb that is bent multiple times to have distinct lengths, as shown in FIGS. 6A and 6B.

In a most preferred embodiment, the total length of the multiple compact fluorescent bulbs 110 is in the range of about 2 to about 21 inches, whether the compact fluorescent bulbs are actually distinct bulbs, or a single bulb having a plurality of distinct lengths Preferably, this could include about 1 inch lengths, with one bend, to about 3.5 inch lengths, with 1 to 3 bends. This provides a high surface area of light emission to provide ample light to illuminate a room or the like Also, it should be noted that any number of shapes and configurations may be used to form compact fluorescent bulbs 110 (or other bulbs), other than the U-shaped configuration shown in the figures. For instance, spiral or helical shapes may be used.

Bulb 100 also includes a plurality of LEDs 120. Similar to embodiments discussed above, LEDs 120 are arranged on an LED board 122 so as to encircle the compact fluorescent bulbs 110 In addition, LEDs 120 include a number of different color LEDs More specifically, as shown in this embodiment, the LEDs of different colors are arranged such that adjacent individual LEDs 120*a* and LEDs 120*b* are LEDs of different colors. With such a configuration, the different colored LEDs may be evenly spaced around the inside of housing 130 to provide a suitable light display when perceived from any side of bulb 100. As discussed above with respect to other embodiments, the LEDs may also be configured differently such that a grouping of different colored LEDs may be positioned close to each other (and optionally, covered by a light diffuser so that the group acts as a single pixel) to give increased control over the perception by a user of the colors to be emitted from housing 130. In such embodiments, LEDs 120 may be controlled to provide a more fluid, continuous change between different emitted colors (e.g., color wash). In the embodiment shown in FIGS. 6A and 6B, the separation of differently colored LEDs 120 *a* and 120*b* provides a more distinct and delineated change of colors, as perceived by user, in comparison with an embodiment in which a group of differently colored LEDs 120 are positioned close to each other so as to be perceived by user as a single pixel. Alternatively, the arrangement may include close groupings of LEDs, with individual LEDs or the grouping still being separately discernable.

LEDs 120, compact fluorescent bulbs 110 and LED board 122 are mounted on base 140, directly or indirectly. Base 140 includes a control circuit board 160 which includes LED power supply 164 and compact fluorescent bulb power supply 162. By providing power (and control) for these features on one board, a more compact bulb 100 is achieved Board 160 may include conventional switches and potentiometers for controlling the functions of the LEDs 120 and fluorescent bulbs 110, as would be understood by one of ordinary skill in the art Alternatively, separate boards may be provided for LEDs 120 and compact fluorescent bulbs 110. Electrical power is supplied to board 160 through its electrical connection (not shown) to connector 150, which receives power when mated with a conventional light socket.

Control board 160 may also include a processor 166 that may use various combinations of software and hardware to control the various lighting functions With respect to LEDs 120, the control may involve control of the color to be emitted by LEDs 120, individually or as a group, when perceived by a user from outside of housing 130 (this may involve the use of a diffuser or the like). In addition, the control mechanisms may control the brightness of the LEDs 120. Further, the control may involve the running of predetermined lighting presentations (e.g., light shows) that vary the light color, brightness, activation, etc., over the course of the presentation to provide an entertaining lighting show The control mechanisms may also control the compact fluorescent bulbs 110, including their brightness or activation In preferred embodiments, the compact fluorescent bulbs 110 are activated on their own, without LEDs 120, to provide normal white light for illuminating a room or other area The LEDs may be used separately as night lights or to provide ambience using color features or color shows that are pleasing to a user.

The light shows may be stored in a memory 168, which may also be included on the control board 160 (Or integrated with processor 166). The memory 168 may include software programs for controlling the circuit board 160 and/or processor 166 to operate the predetermined presentations.

Figure 7:
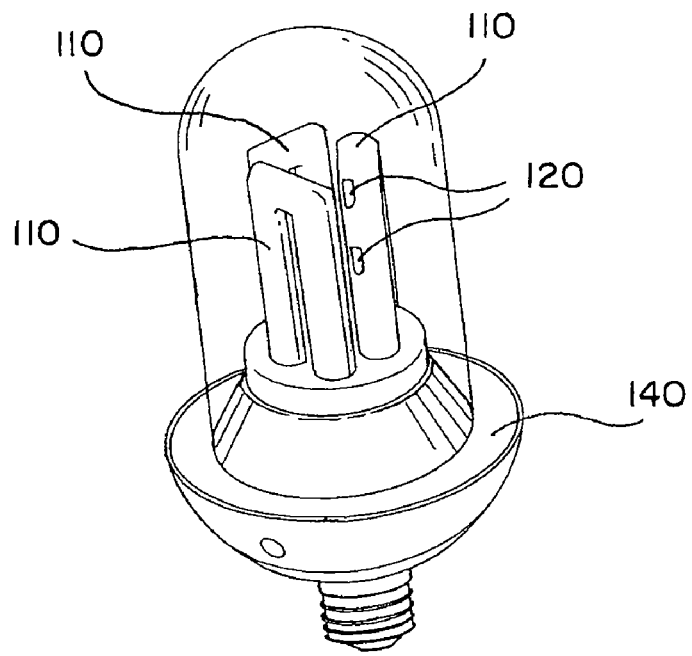
FIG. 7 is a perspective view of another bulb according to another embodiment of our invention.
Figure 8:
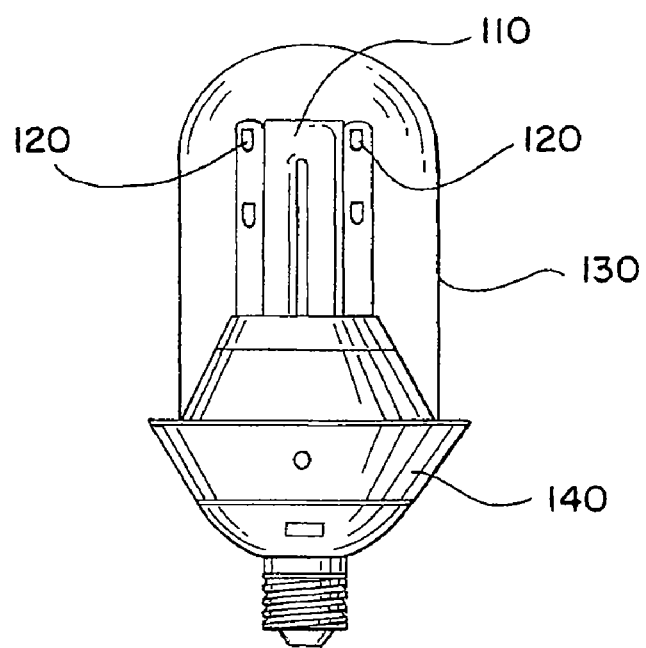
FIG. 8 is a side view of the bulb shown in FIG. 7
Figure 9:
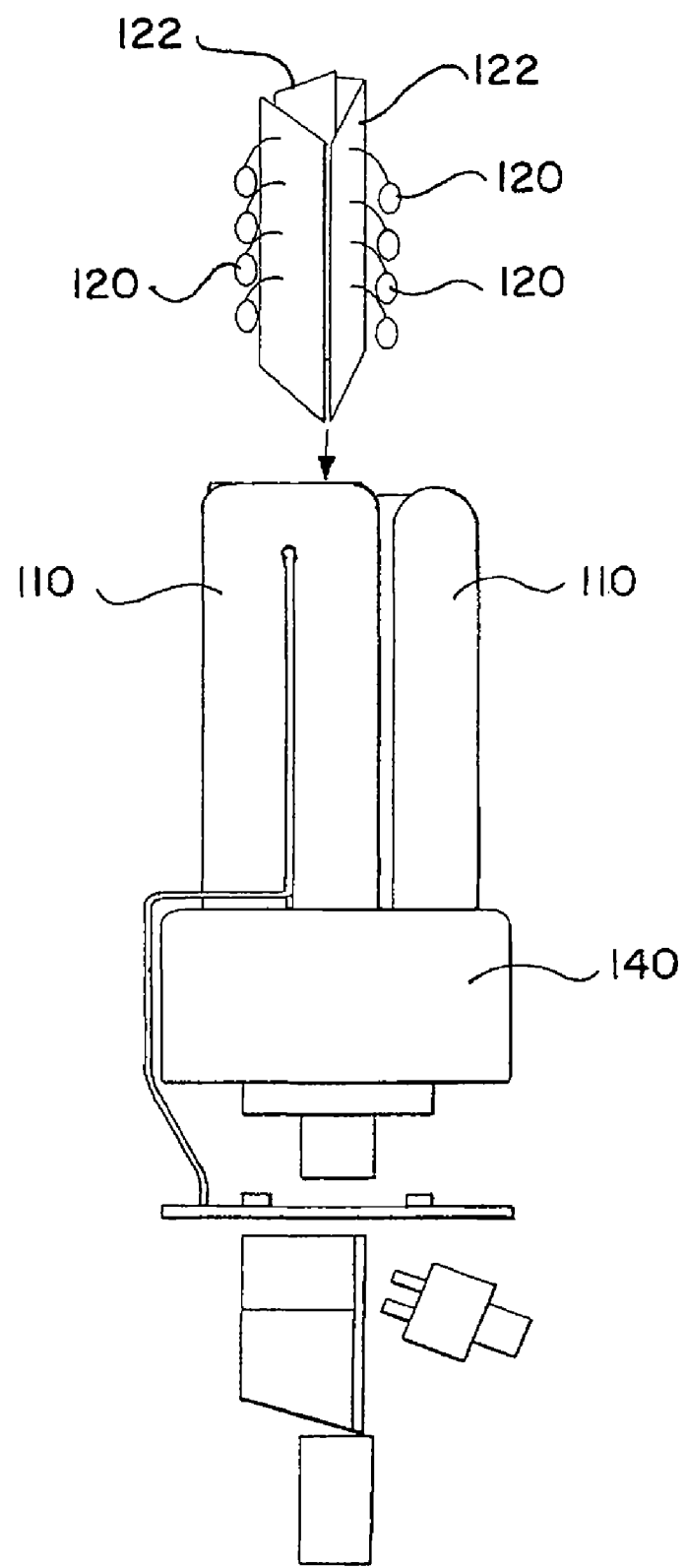
FIG. 9 is a partially exploded view of the bulb shown in FIGS. 8 and 9.

A user interface 170 is provided on base 140 so as to provide a user with control of the control board 160 and/or processor 166. The user interface may allow the user to select the colors, brightness, activation, etc of the LEDs 120 and compact fluorescent bulbs 110. In the depicted embodiment, the user interface 170 is a button which a user can toggle to switch between different settings In other embodiments, user interface 170 may be more elaborate (and be provided at base 140, or remote locations) so as to allow a user more sophisticated control of the operation of the bulb 100. This could include the ability to design programs including color changes, changes in brightness of various components, timed activations and/or deactivations, etc., and combinations thereof FIGS. 7-9 show a modification of the bulb shown in FIGS. 6A and 6B. In particular, there are provided three compact fluorescent bulbs 110 (which may include three distinct fluorescent bulbs or three distinct lengths of light emission of a single fluorescent bulb). Again, the separate compact fluorescent bulbs 110 are provided so as to extend from the base 140 vertically up through the housing 130 to a position near the top thereof. In this embodiment, however, LEDs 120 are not arranged circularly around the compact fluorescent bulbs 110 near the base 140, but are arranged in vertical groupings, each grouping extending between separate compact fluorescent bulbs 110. As shown in FIG. 9, each grouping of LEDs 120 extending between adjacent compact fluorescent bulbs 110 may be secured to a separate LED board 122. This provides a slightly different lighting effect that may distribute colored light more effectively.

With the above-described various embodiments, our invention provides a bulb similar in size, shape and compatibility to conventional light bulbs, but with enhanced features and control, including colors, color changing and light shows. However, because our invention still mates with conventional light sockets, and is generally shaped similarly to that of a conventional incandescent bulb (at least in one embodiment), it may be used in existing light fixtures and accommodate conventional light shades. Specifically, housing 130 is preferably shaped/sized so as to be able to receive the connection means provided on conventional light shades to secure the same to typical light bulbs. In particular, with respect to FIG. 6A, the diameter of housing 130 at position 132 (a wider top portion of housing 130) is preferably in the range of about 1.75 to about 3.25 inches, and the diameter of housing 130 at position 134 is preferably about 1 to about 3 inches Most preferably the of the bulb substantially complies with conventional bulb sizes A-19 (with position 132 measuring about 2.375 inches) and A-21 (with position 132 measuring about 2.625 inches).

In addition, bulb 100 preferably emits white light from compact fluorescent bulbs, or other light emission devices in a range of about 160 to about 4200 lumens; and more preferably in the range of about 240 to about 2625 lumens; and most preferably in the range of about 320 to about 2100 lumens. Also, a bulb according to our invention preferably draws power in the range of about 5 to about 200 watts; and more preferably in a range of about 15 to about 125 watts; and most preferably in a range of about 25 to about 100 watts. Consequently, our invention is designed for use in many settings where conventional bulbs would typically be used.

It should also be recognized, however, that other suitable illumination sources, such as a halogen bulb or high intensity discharge bulb, may be used to provide illumination light as would be readily understood by one of ordinary skill in the art.

INDUSTRIAL APPLICABILITY

This invention provides lighting for both illumination purposes and for the creation of ambient conditions in a single device, which may be adjusted manually to change and which may be programmed to automatically change such lighting

What is claimed is:

1. An electrical lamp comprising:
   a plurality of fluorescent bulbs arranged in a circle and mounted to an illumination socket, the fluorescent bulbs emitting illumination light when supplied with electrical power;
   a plurality of light emitting diode boards;
   a plurality of light emitting diodes, each of the plurality of light emitting diodes connected to a respective wire extending from a corresponding one of the plurality of light emitting diode boards, the plurality of light emitting diodes and wires being arranged in vertical groups on the light emitting diode boards, and the plurality of light emitting diodes emitting light of different colors when supplied with electrical power;
   a base on which the illumination socket and the light emitting diode boards are mounted such that the vertical groups of light emitting diodes are positioned between adjacent fluorescent bulbs;
   a first electrical circuit connected to supply electrical power to the fluorescent bulbs mounted in the illumination socket for causing the fluorescent bulbs to emit illuminating light;
   a second electrical circuit connected to supply electrical power to the light emitting diodes for causing the light emitting diodes to emit light of different colors;
   a switch for selectively switching the application of electrical power between the first electrical circuit and the second electrical circuit;
   a user interface provided adjacent to the bottom of the base; and
   a programmable circuit connected to the second electrical circuit and configured to adjust the intensities of the light of different colors according to a predetermined program indicated by the user interface, wherein the plurality of light emitting diode boards are mounted to the base and within the circle of fluorescent bulbs such that the vertical groups of light emitting diodes are positioned between adjacent fluorescent bulbs.

2. The electrical lamp according to claim 1, wherein the first electrical circuit includes a dimmer to adjust the intensity of the illumination light.

3. The electrical lamp according to claim 1, wherein the second electrical circuit includes a dimmer configured for selective adjustment of the intensities of the light of different colors.

4. A light bulb comprising:
a plurality of fluorescent light emitting devices arranged in a circle;
a plurality of light emitting diode boards;
a plurality of light emitting diodes that emit light of different colors, each of the plurality of light emitting diodes connected to a respective wire extending from a corresponding one of the plurality of light emitting diode boards, the plurality of light emitting diodes and wires being mounted in vertical groups on the light emitting diode boards;
a base on which the fluorescent light emitting devices and the light emitting diode boards are mounted adjacent to each other;
a first electrical circuit connected to supply electrical power to the fluorescent light emitting devices;
a second electrical circuit connected to supply electrical power to the light emitting diodes;
a switch for selectively switching the application of electrical power between the first electrical circuit and the second electrical circuit;
a user interface; and
a programmable circuit connected to the second electrical circuit and the user interface, the programmable circuit configured to adjust the intensities of the light of different colors according to a predetermined program indicated by the user interface,
wherein the plurality of light emitting diode boards are mounted to the base and within the circle of fluorescent bulbs such that the vertical groups of light emitting diodes are positioned between adjacent fluorescent bulbs.

5. The light bulb according to claim 4, wherein the first electrical circuit includes a dimmer to adjust the intensity of the plurality of fluorescent light emitting devices.

6. The light bulb according to claim 4, wherein the second electrical circuit includes a dimmer configured for selective adjustment of the intensities of the light of different colors.

7. The light bulb according to claim 4, further including a sensor for sensing at least one of temperature, scent, motion, and sound,
wherein the programmable circuit adjusts at least one of the intensities and colors of the light of different colors in response to a signal from the sensor.

8. The light bulb according to claim 4, wherein the plurality of fluorescent light emitting devices are releasably mounted in the light bulb.

9. A light bulb comprising:
a base configured to be mounted in a light bulb socket;
a plurality of compact fluorescent bulbs mounted in a circle on the base;
a plurality of light emitting diode boards;
a plurality of light emitting diodes, each of the plurality of light emitting diodes being connected to a respective wire extending from a corresponding one of the plurality of light emitting diode boards, with the plurality of light emitting diodes and wires being arranged in vertical groups on the light emitting diode boards;
a control circuit that supplies power from the light bulb socket, when the base is mounted therein, to the plurality of fluorescent bulbs and the plurality of light emitting diodes, the control circuit including a user interface;
a translucent housing mounted on the base and containing the plurality of fluorescent bulbs and the plurality of light emitting diodes;
a user interface;
a programmable circuit connected to the control circuit and the user interface, the programmable circuit configured to adjust the intensities of the plurality of light emitting diodes according to a predetermined program indicated by the user interface; and
a sensor, being provided on the base, for sensing at least one of temperature, scent, motion, and sound,
wherein the programmable circuit adjusts at least one of the intensities and colors of the plurality of light emitting diodes in response to a signal from the sensor, and
wherein the plurality of light emitting diode boards are mounted to the base and within the circle of fluorescent bulbs such that the vertical groups of light emitting diodes are positioned between adjacent fluorescent bulbs.

10. The bulb according to claim 9, wherein the plurality of fluorescent bulbs are about 2 to about 21 inches in length, the plurality of fluorescent bulbs being folded back on themselves a plurality of times so as to form a plurality of lengths extending up from the base within the housing.

11. The bulb according to claim 9, further comprising a common circuit board to provide power to the plurality of fluorescent bulbs and the plurality of light emitting diodes.

12. The bulb according to claim 9, wherein the plurality of fluorescent bulbs emits light within the range of about 160 to about 4200 lumens.

13. The bulb according to claim 12, wherein at least one of the plurality of fluorescent bulbs emits light within the range of about 240 to about 2625 lumens.

14. The bulb according to claim 13, wherein the at least one fluorescent bulb emits light within the range of about 320 to about 2100 lumens.

15. The bulb according to claim 9, further comprising a memory storing one or more programs defining the predetermined program.

16. The bulb according to claim 9, wherein the user interface is remotely controlled by a user so as to perform at least one of: (i) activating one or more of a plurality of predetermined presentations, and (ii) selecting one or more colors of light to be emitted from the housing by the plurality of light emitting diodes.

17. The bulb according to claim 16, wherein the user interface is remotely controlled by one of an infrared signal and a radio signal.

* * * * *